Dec. 1, 1959 D. KONG 2,915,680

SEMI-CONDUCTOR RECTIFIER

Filed Aug. 6, 1956

INVENTOR.
DANIEL KONG
BY D. Gordon Angus
ATTORNEY.

United States Patent Office 2,915,680

Patented Dec. 1, 1959

2,915,680

SEMI-CONDUCTOR RECTIFIER

Daniel Kong, Los Angeles, Calif., assignor to International Rectifier Corporation, El Segundo, Calif., a corporation of California Application August 6, 1956, Serial No. 602,176

9 Claims. (Cl. 317—101)

This invention relates to structures comprising electrical circuits, and has for an object to provide an arrangement for assembling components or units in an electric circuit or system.

I carry out my invention by incorporating the circuit units or components in a printed circuit. Printed circuits are well known and it is known to connect circuit components into them. There are problems attending the connection of some kinds of components into a printed circuit however. For example, power rectifier units develop considerable heat and provision should be made for dissipating the heat. Moreover, such rectifier units should have adequate protection.

In accordance with my present invention, I provide an assembly and housing arrangement of a rugged and compact nature in which the unit may readily be connected with the printed circuit.

According to a feature of the invention, I attach a circuit unit within an individual housing which constitutes a terminal of the unit. The unit housing is provided with tab means to enable it to pierce the panel of the printed circuit and to connect therewith. The other terminal of the unit is brought through a suitable eyelet or the like of the printed circuit. By providing suitable slots in the panel on which the printed circuit is formed as well as suitable eyelets at the proper places, a number of individual housings containing individual circuit units can be connected to the same panel.

The invention is contemplated with particular reference to rectifiers such as the germanium power type; although it should be understood that other circuit components could as well be connected with the printed circuit.

The foregoing and other features of the invention will be better understood from the following detailed description and the accompanying drawing of which:

Figures 1, 2, 3:
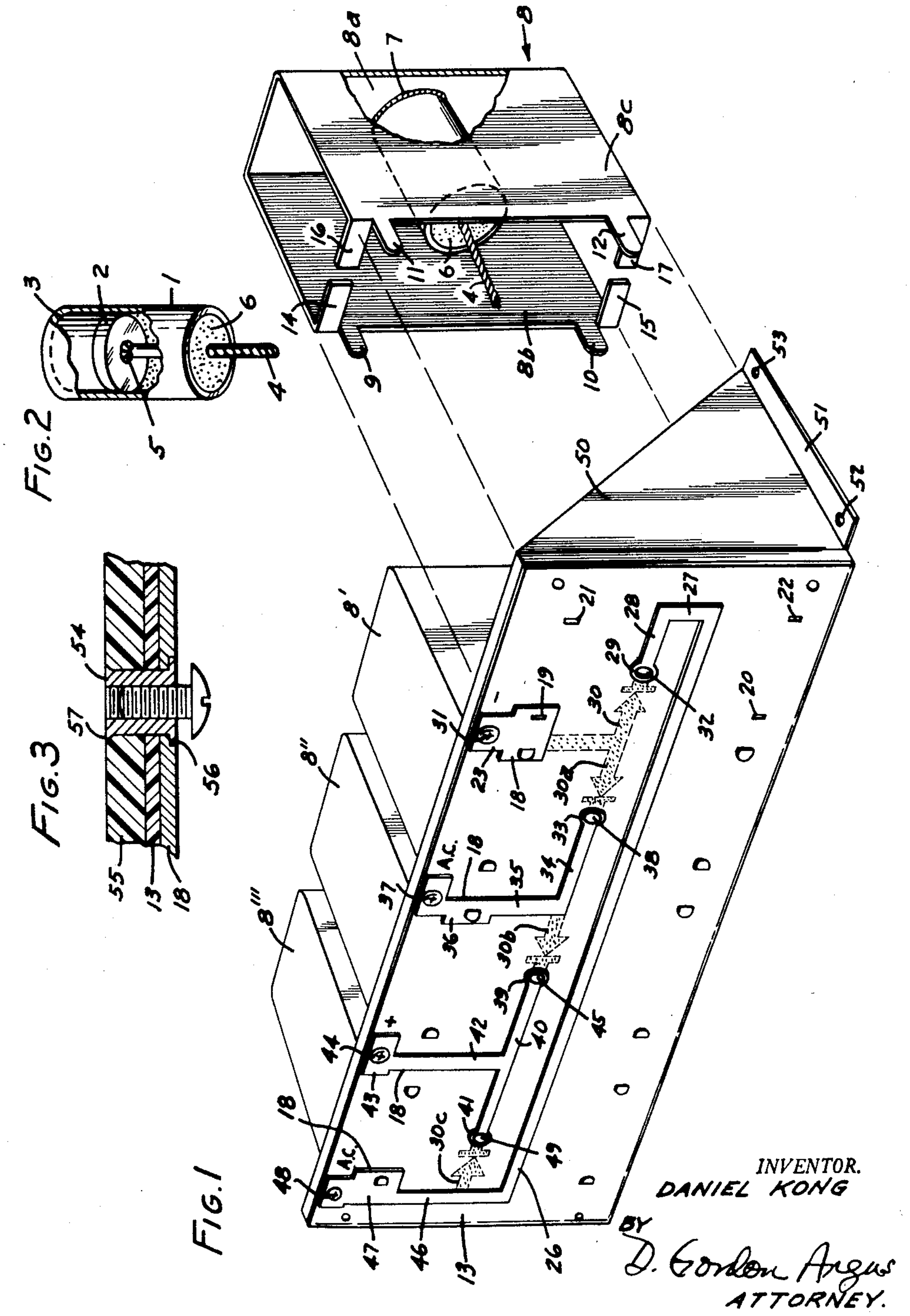
Fig. 1 shows an isometric view, partly exploded, of a structure embodying my invention.
Fig. 2 is a perspective view, partially in cross-section of a rectifier unit used with the assembly of Fig. 1.
Fig. 3 shows in cross-section a detail of the construction used in Fig. 1.

Referring to Fig. 1 of the drawings, there are shown the structural features of the rectifier assembly and circuit. The individual rectifier elements are each enclosed in a cylindrical container or cup 1 as shown in Fig. 2. The particular construction and composition of the individual rectifier unit is not of major consequence in respect to the invention disclosed herein; and hence need not be described in complete detail. While any dry plate or junction type rectifier element may be used such as selenium, silicon or germanium, the description will be made with particular reference to a germanium junction type element which is well known in the art.

The germanium unit is shown as comprising a germanium wafer 2 mounted, as by soldering, to a suitable conductive base member 3 which in turn is fastened as by soldering or welding inside the closed end of the cup

1. A suitable terminal lead 4 is brought to the germanium surface and soldered in position by a suitable solder 5 which ordinarily contains an active element such as antimony or indium to enhance the rectifying properties in a well known manner. The terminal or cable 4 is brought out the open end of the condenser; and the container is then filled with a suitable insulating filling or potting substance 6 which solidifies to form a solid unit. The cup or container 1 can conveniently be a conductive metal, preferably copper. It will be recognized that the cup 1 constitutes one terminal of the rectifier element while the lead or cable 4 is the other terminal.

The cup 1 is soldered or welded at 7 to the inside back 8*a* of a housing 8, which houses the rectifying unit. The housing can conveniently be of stamped-out copper and is of a sufficient size to contain the rectifying unit and to supply adequate cooling, and to give rigidity to the assembly. At equal distances from the center of the rectifying unit 1 the housing is provided with parallel sides 8*b* and 8*c* which form a partial envelope or box-like structure constituting the housing. The sides 8*b* and 8*c* of the housing extend forward such a distance as is necessary to contain the rectifying unit and its conducting terminal cable 4.

Extending forward from each side and in the same plane as its respective side are two metal tabs 9, 10, 11, 12 of the same stock as the housing. The tabs are of sufficient length so they may pass completely through and be bent over in front of a panel 13 to which they attach. Additional stock of the sides is bent inward 90° to form ears or front surfaces 14 and 15 of the housing, one at the upper edge and one at the lower edge of each side. These surfaces do not extend beyond the center of the housing on its front side. Similar surfaces 16 and 17 extend in the same manner inward from the other side of the housing.

In the arrangement shown, there are used four such housings as the housing 8 containing its rectifier unit; the additional housings being designated 8′, 8″ and 8‴, respectively. The three housings 8′, 8″, and 8‴ are shown attached in their proper positions at the back of panel 13; and it will be understood that the housing 8, when assembled to the panel, will be brought up to its position alongside housing 8′.

The panel 13 to which the several housings are attached should be of a suitable insulating material, for example a plastic such as plexiglass on which there is formed or printed, the circuit 18 in which the several rectifier units are to be incorporated. The mechanical connection of the several housings is by means of the housing tabs which extend through the corresponding slots of the panel. Referring to the housing 8, its four tabs 9, 10, 11 and 12 will be brought through the respective four slots 19, 20, 21 and 22 of the panel; and then the tabs will be bent over at the front of the panel through a ninety degree bend to secure the housing through the panel. The tabs for the housing 8′, 8″ and 8‴ are shown through the panel and in their bent over position; and only the slots 19, 20, 21 and 22 are shown open since they are ready to receive the tabs of housing 8.

The printed circuit formed on the front of the panel can be any circuit in which it is desired to incorporate the rectifier units. The particular circuit shown on panel 13 is that for a bridge. It comprises conductive strips or portions 47, 46, 26, 27 and 28 in series arrangement with each other; also strips or portions 34, 35 and 36 joined together; strips or portions 40, 42 and 43 joined together; and the portion 23. The strips or portions can be made or formed on the panel in any desired manner well understood in the art of printed circuits. For example, they can be strips of metal attached to the panel in some suitable manner or may be electrodeposited or the like. The arrangement is such that when the rectifier units are connected in their proper positions in the printed circuit there will be formed a bridge arrangement as is indicated by the rectifier symbols 30, 30*a*, 30*b* and 30*c* which are depicted for example by paint or etching in the spaces left between portions of the printed circuit.

The terminal screws 31, 37, 44 and 48 in contact with circuit portions 23, 36, 43 and 47 respectively may also be identified by paint or etching on the panel. The terminal screws are respectively the negative and positive terminals 31 and 44 and the A.C. input terminals 37 and 48.

The electrical connections of the individual rectifier units into the printed circuit on the panel, are made in two ways. Referring to the housing 8, a tab 9 of the housing forms an electrical connection with the printed circuit portion 23 by being bent over in close contact with the front of portion 23. This connects the base of rectifier unit 1 with portion 23. The other terminal 4 of rectifier unit 1 is connected into the printed circuit by having its end protrude through the panel and into an eyelet 29 formed at the end of the printed circuit portion 28. A terminal 4 is then soldered into the shank of a hollow shank metal rivet 32 which fits through the eyelet 29 of the printed circuit and over the end of terminal 4. It will thus be apparent that the rectifier unit 1 will be placed in the position depicted by the pictorial representation 30. The rectifier units of the other three housings 8′, 8″ and 8‴ are connected in the printed circuit in a similar manner. Thus for each housing, the terminal lead corresponding to terminal 4 of housing 8, is connected through eyelets 33, 39 and 41 and into rivets 38, 45 and 49 respectively, and soldered in place. A tab of each housing is connected respectively with printed circuit portions 23, 36 and 47. The tabs are likewise all preferably soldered to their respective printed circuit portions. It will be recognized that the rectifier units of housings 8′, 8″ and 8‴ will appear in the printed circuit at the positions depicted by the representations **30*a***, 30*b* and 30*c*, respectively.

At each end of the panel and in the back may be mounted a metal bracket 50 of the desired strength. A bracket extends from an upper corner of the panel in back at a desired angle to a point in the same horizontal plane as the bottom edge of the panel. A flange 51 is bent outward from the same stock to provide a horizontal surface for mounting with screws. Holes 52 and 53 are drilled in this flange for such mounting. The bracket 50 is attached to the panel by a similar flange bent into the same plane as the panel by means of drilled holes and screws.

The terminal screws 31, 37, 44 and 48 and their assembly are shown by example in Fig. 3. A thin panel 13 of a low melting plastic is used in the embodiment shown. To insulate from heat conducted from the rectifier housings 8, 8′, 8″ and 8‴ an insulation layer 55 of fiber glass may be added. The metal circuit portions 23, 36, 43 and 47 are countersunk at 56 and drilled to provide holes for a metal eyelet 54 which is internally threaded to terminal screw size. The panel 13 and underlying insulation layer 55 are also drilled to provide for eyelet 54. The eyelet 54 is of a depth necessary to be level with the surface of the metal portions 23, 36, 43 and 47 and at the same time pass through the panel 13 and the insulation layer 55. The insulation layer 55 is countersunk at 57 so that eyelet 54 may be flanged over to hold it securely in the drilled hole.

The assembly arrangement of the present invention is applicable to use in connection with printed circuits placed on an insulating panel, wherein the printed circuit contains one or more discontinuities within which there is to be connected a rectifier or other circuit element or unit. The arrangement involves slots or openings through the panel and also through the portions of the printed circuit at one side of each discontinuity, for the purpose of receiving a tab of the unit housing. The arrangement also involves a hole through the panel and through the portion of the printed circuit at the other side of the discontinuity through which there extends the terminal lead from the circuit element or unit which is to be connected with the last mentioned portion of the printed circuit.

It will be recognized that by my invention I have provided a simple arrangement for connecting rectifiers in a circuit. It is economical on parts and costs, particularly since the assembly time required is relatively small. The arrangement itself is particularly well adapted when compact size consistent with ability to dissipate heat is a requirement. The system moreover is flexible in that it permits the use of a number of different circuits. Moreover a minimum of tooling and retooling is required.

The arrangement of this invention is not necessarily limited to use with rectifier units. Other circuit elements could as well be connected into a printed circuit in the same way. For example, the circuit element or unit within the container 1 could, for example, be some other type of circuit element such as a resistor or coil or condenser.

It will be seen that various modifications may be made without departing from the scope of the invention. For example, the units need not be in the same form as the unit 1, as various other forms of units could be used instead. Furthermore, it will be recognized that the printed circuit need not be in the form of the particular bridge illustrated in Fig. 1, as some other circuit comprising a rectifier or rectifiers could be used instead. The invention is not limited except in accordance with the scope of the appended claims.

The arrangement furthermore permits an informative design showing the location of the individual rectifiers in the circuit which makes for ease of application.

The arrangement is not only decorative, but also permits of advertising space on the panel.

I claim:

1. In combination with a panel of electrical insulating material having thereon a printed circuit containing a discontinuity into which a circuit element may be connected, means comprising a conductive housing to the inside of which said circuit element is mounted, said panel having a slot through the printed circuit at one side of the discontinuity and a hole through the printed circuit at the other side of the discontinuity, said circuit element having a terminal electrically connected with said housing and having another terminal passing through said hole and in contact with the portion of said printed circuit adjacent the hole, and said housing having a conductive tab integral therewith passing through the slot and in electrical contact with the portion of the printed circuit adjacent the slot, said tab also serving to attach said housing to the panel.

2. A combination according to claim 1 in which the circuit element is a rectifier.

3. In combination with a panel of electrical insulating material having thereon a printed circuit containing a discontinuity into which a circuit element may be connected, means comprising a conductive housing, said panel having a slot therethrough, said slot extending through the printed circuit at one side of the discontinuity, said panel also having a hole therethrough, said hole extending through the printed circuit at the other side of the discontinuity, a conductive cup mounted inside of and mounted to said housing and in electrical communication with the housing, said circuit element being located within said cup and having one of its terminals connected with the cup, and having another of its terminals connected to a terminal lead which passes out of the cup and housing and through said hole and in electrical contact with the portion of said printed circuit adjacent the hole, and said housing including a conductive tab integral therewith passing through the slot and in electrical contact with the portion of the printed circuit adjacent the slot, said tab also serving to attach said housing to the panel.

4. In combination a panel of electrical insulating material having on one of its surfaces a printed circuit containing a discontinuity in which a circuit element may be connected, means comprising a conductive housing within which said circuit element is mounted, said panel having a plurality of slots passing through it, at least one of said slots also passing through the printed circuit at one side of the discontinuity, a hole through the panel and through the printed circuit at the other side of the discontinuity, said circuit element being mounted within said housing and having one of its terminals electrically connected to the housing, and having another terminal in the form of a lead passing through said hole and in electrical contact with the portion of said printed circuit adjacent the hole, and said housing having a plurality of tabs corresponding in position to the positions of said slots, the tabs passing through the respective slots and the tab passing through the slot which is through the printed circuit being folded so as to be in electrical contact with the printed circuit, the others of said tabs being folded into contact with the panel so that the tabs hold the housing to the panel.

5. In combination with a panel of electrical insulating material having on one of its surfaces a printed circuit containing a plurality of discontinuities into which circuit elements may be connected, means comprising a plurality of conductive housings within which the respective circuit elements are mounted, said panel having rows of slots, there being at least one of said slots passing through the printed circuit at one side of each discontinuity, a hole through the panel and through the printed circuit at the other side of each discontinuity, each circuit element having a terminal electrically connected with its respective housing and having another terminal passing through one of said holes and in electrical contact with the portion of said printed circuit adjacent the last mentioned hole, and each of said housings having tabs passing through respective slots through said panel, at least one tab of each housing passing through a slot which also passes through a printed circuit portion, said last mentioned tab also serving to attach said housing to the panel.

6. A combination according to claim 5, in which the circuit elements are rectifiers.

7. A combination according to claim 5 in which the housing is provided with ears at the edges of the housing which have the tabs, said ears bearing against the opposite side of the panel from the tabs so the panel is held between them.

8. A rectifier assembly comprising: a panel of insulating material having a pair of opposite faces; a printed circuit on one of said faces which has four discontinuities, a slot and a hole through the panel and printed circuit, a slot being at one end of each discontinuity, and a hole being at the other end of each discontinuity; four rectifier elements, each element including a conductive housing, a rectifier mounted within and to said housing, with one terminal of each rectifier electrically connected to the housing, and with another terminal connected to a lead, conductive tabs integral with each housing adapted to pass through said slots, one of said leads passing through each of said holes and electrically connected to the printed circuit adjacent thereto, one of said tabs of the same housing as that from which the lead projects passing through the slot on the other side of the respective discontinuity from the hold into which the lead projects, the tabs being folded over onto the printed circuit so as to make an electrical connection therewith so as to bridge the discontinuity and mount the housing to the panel, the tabs of a first and a second of said rectifier elements being conductively interconnected by a first segment of the printed circuit, a second segment of the printed circuit interconnecting the lead of the first of the rectifier elements to a tab of a third rectifier element, the lead of said third rectifier element being connected by a third segment of the printed circuit to the lead of a fourth of said rectifier elements, and a tab of the fourth of the rectifier elements being connected to the lead of the second of the rectifier elements by a fourth segment of the printed circuit, the second and fourth segments being adapted to be utilized as A.C. terminals for the assembly, and the first and fourth segments being adapted to be utilized as negative and positive terminals, respectively, for the assembly.

9. Apparatus according to claim 8 in which each segment of the printed circuit is adapted for use as a terminal by the inclusion of a conductive eyelet in said panel which overlaps and makes conductive contact with its respective segment, and a headed screw threaded into the eyelet for attaching a wire thereto.

References Cited in the file of this patent

UNITED STATES PATENTS

| | | |
|---|---|---|
| 1,689,358 | Miller | Oct. 30, 1928 |
| 2,066,511 | Arlt | Jan. 5, 1937 |
| 2,202,166 | Peck | May 28, 1940 |
| 2,636,073 | Clarke | Apr. 21, 1953 |
| 2,762,987 | Mackey | Sept. 11, 1956 |

FOREIGN PATENTS

| | | |
|---|---|---|
| 699,550 | Great Britain | Nov. 11, 1953 |